United States Patent
Salami et al.

(10) Patent No.: US 9,749,993 B2
(45) Date of Patent: *Aug. 29, 2017

(54) CONTROLLING UPLINK TRANSMIT POWER IN A PLURALITY OF BASESTATIONS

(71) Applicant: Ubiquisys Limited, Swindon (GB)

(72) Inventors: Gbenga Salami, West Swindon (GB); Sandro Grech, Bath (GB)

(73) Assignee: Ubiquisys Limited, Swindon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,971

(22) Filed: Jan. 26, 2017

(65) Prior Publication Data

US 2017/0142690 A1    May 18, 2017

Related U.S. Application Data

(62) Division of application No. 14/181,022, filed on Feb. 14, 2014.

(30) Foreign Application Priority Data

Feb. 18, 2013 (GB) .................................. 1302813.9

(51) Int. Cl.
*H04W 40/08* (2009.01)
*H04W 72/04* (2009.01)
(Continued)

(52) U.S. Cl.
CPC ......... *H04W 72/04* (2013.01); *H04W 52/146* (2013.01); *H04W 52/244* (2013.01)

(58) Field of Classification Search
CPC ... H04W 52/146; H04W 16/32; H04W 24/02; H04W 72/082; H04W 52/245;
(Continued)

(56) References Cited

U.S. PATENT DOCUMENTS

2010/0234040 A1* 9/2010 Palanki .............. H04W 52/244
                                                     455/452.2
2011/0074387 A1    3/2011 Zhuang
(Continued)

FOREIGN PATENT DOCUMENTS

CN         101729102 A     6/2010
EP           2337408 A1    6/2011
(Continued)

OTHER PUBLICATIONS

UK Search Report dated Aug. 20, 2013 for GB Application No. 1302813.9.
(Continued)

*Primary Examiner* — Quan M Hua
(74) *Attorney, Agent, or Firm* — Weaver Austin Villeneuve & Sampson LLP

(57) ABSTRACT

A method for controlling uplink transmit power for a plurality of basestations in a mobile communications network is disclosed. The basestations may form a second layer within the network, and the network may comprise another plurality of basestations forming a first layer. The method comprises clustering the plurality of second layer basestations according to association with first layer basestations, exchanging second layer basestation loading information between second layer basestations belonging to the same cluster, and dynamically setting uplink transmit power limits for individual second layer basestations based on the exchanged loading information. The method may further comprise updating the clustering of the second layer basestations according to dynamic variation in association of second layer basestations with first layer basestations. The method may also comprise dynamically controlling uplink resource allocation such that concurrent use of the same frequency resource by more than one second layer basestation is reduced.

17 Claims, 6 Drawing Sheets

(51) Int. Cl.
*H04W 52/14* (2009.01)
*H04W 52/24* (2009.01)

(58) Field of Classification Search
CPC ........... H04W 72/0406; H04W 72/042; H04W 72/085; H04W 40/08; H04W 52/367; H04L 5/0035; H04B 17/382; H04B 7/2606
See application file for complete search history.

(56) References Cited

U.S. PATENT DOCUMENTS

| | | |
|---|---|---|
| 2011/0237244 A1 | 9/2011 | Hiltunen et al. |
| 2013/0272170 A1 | 10/2013 | Chatterjee et al. |
| 2013/0331109 A1 | 12/2013 | Dhillon et al. |
| 2014/0235259 A1 | 8/2014 | Salami et al. |
| 2017/0142663 A1 | 5/2017 | Salami et al. |

FOREIGN PATENT DOCUMENTS

| | | |
|---|---|---|
| WO | WO2012/016395 | 2/2012 |
| WO | WO2012/088835 | 7/2012 |

OTHER PUBLICATIONS

Notice of Allowance dated Oct. 31, 2016 for U.S. Appl. No. 14/181,022.
Office Action dated Jun. 24, 2016 for U.S. Appl. No. 14/181,022.
Notice of Allowance dated Jun. 19, 2017 for U.S. Appl. No. 15/416,967, and allowed claims.

\* cited by examiner

CONTROLLING UPLINK TRANSMIT POWER IN A PLURALITY OF BASESTATIONS

CROSS REFERENCE TO RELATED APPLICATIONS

This application is a divisional of U.S. patent application Ser. No. 14/181,022, filed on Feb. 14, 2014, which claims priority to GB 1302813.9 filed Feb. 18, 2013, entitled CONTROLLING UPLINK TRANSMIT POWER IN A PLURALITY OF BASESTATIONS, by Salami et al., each of which prior application is hereby incorporated by reference and for all purposes. The present application claims priority to and benefit of each of these applications.

BACKGROUND

The present invention relates to a basestation for use in a cellular mobile communications network, and to a method for controlling uplink transmit power for a plurality of basestations in a mobile communications network.

Small cell basestations are known and used in many cellular networks. A small cell basestation forms an access point that provides mobile coverage in areas where such coverage is problematic. Small cell basestations may for example be deployed indoors in residential, public access, or business premises, or in hot-spot or rural outdoor locations. The small cell basestation connects to the core network of a cellular network operator and provides cellular network coverage for subscribers within a coverage area of the small cell. Small cell basestations are intended to complement existing macro layer network coverage such that user equipment devices may attach to and use either a macro layer basestation or a small cell basestation, depending on their location.

Small cell basestations may be deployed co channel with a macro layer carrier, or may operate on a partially overlapping carrier, which may for example be straddled between two macro layer carriers. Engineering the radio frequency coexistence of the small cell basestations and the macro layer basestations is an important design consideration in the deployment of small cell basestations. While both uplink and downlink channels have to be considered, the present specification addresses coexistence issues concerned with uplink channels, that is wireless transmission of signals from user equipment devices (UEs) to a basestation.

In systems supporting time and/or frequency domain multiple access techniques, resources may be partitioned to enforce isolation between the macro and small cell layers. However, it is often the case that better resource efficiency can be achieved by ensuring that uplink power controlled by the small cell layer remains below the macro noise floor while maintaining full flexibility on time and frequency resource allocation. Existing procedures typically achieve this by limiting the maximum uplink transmit power for basestations in the small cell layer to a fixed amount, known as the uplink noise margin, below the macro noise floor. The uplink noise margin is established based on the expected macro noise rise contribution of user equipment devices (UEs) connected to the small cell layer. This noise margin is used by all basestations operating on the small cell layer. In establishing an appropriate uplink noise rise margin, the aim of protecting macro layer basestations has to be balanced against potential adverse impact on uplink performance of the small cell layer.

The coexistence issues described above are experienced in WCDMA and other 3G technologies, as well as in many heterogeneous and other multilayered network technologies and systems, including for example LTE.

SUMMARY

According to an aspect of the present invention, there is provided a method for controlling uplink transmit power for a plurality of basestations in a mobile communications network, wherein the basestations form a second layer within the network, and wherein the network comprises another plurality of basestations forming a first layer, the method comprising:
  clustering the plurality of second layer basestations according to association with first layer basestations;
  exchanging second layer basestation loading information between second layer basestations belonging to the same cluster; and
  dynamically setting uplink transmit power limits for individual second layer basestations based on the exchanged loading information.

The method may further comprise updating the clustering of the second layer basestations according to dynamic variation in association of second layer basestations with first layer basestations.

According to a second aspect of the present invention, there is provided a method for controlling uplink resource allocation for a plurality of basestations in a mobile communications network, wherein the basestations form a second layer within the network, and wherein the network comprises another plurality of basestations forming a first layer, the method comprising:
  clustering the plurality of second layer basestations according to association with first layer basestations;
  exchanging second layer basestation loading information between second layer basestations belonging to the same cluster; and
  dynamically controlling uplink resource allocation for individual second layer basestations based on the exchanged loading information.

According to another aspect of the present invention, there is provided a basestation for use in a mobile communications network, wherein the basestation is adapted to control its uplink transmit power in accordance with the method of the first aspect of the present invention.

BRIEF DESCRIPTION OF THE DRAWINGS

For a better understanding of the present invention, and to show more clearly how it may be put into effect, reference will now be made, by way of example, to the accompanying drawings, in which.

DETAILED DESCRIPTION

Figure 1:
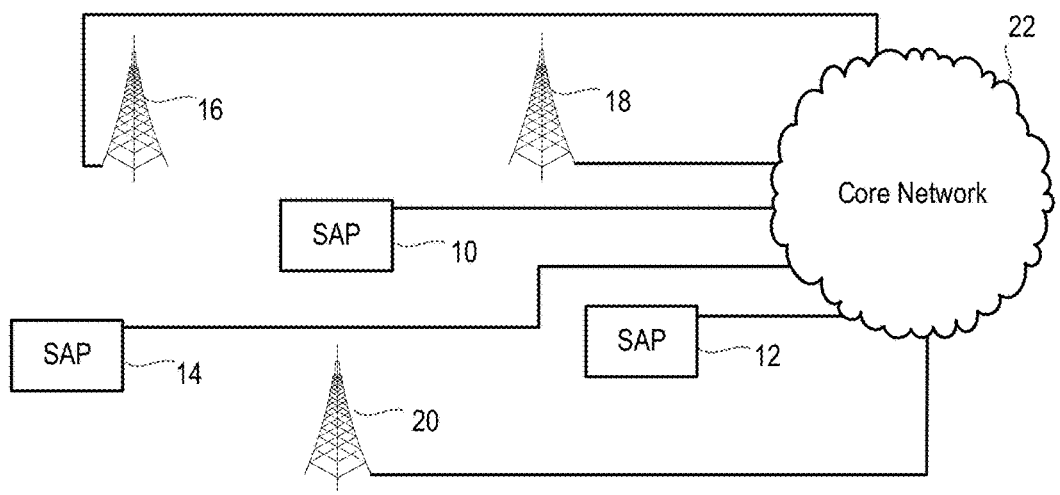
FIG. 1 illustrates a part of a cellular mobile communications network operating in accordance with an aspect of the present invention.

FIG. 1 shows a part of a cellular mobile communications network comprising first and second layers of basestations. The first layer of basestations is a macro layer, comprising macro basestations 16, 18 and 20. The second layer of basestations is a small cell layer, comprising small cell basestations, or small cell access points (SAPs) 10, 12 and 14. It will be appreciated that a practical network will include many more macro layer and small cell basestations, but the present invention can be described sufficiently without illustrating additional basestations.

The macro basestations and SAPs communicate over wired or wireless backhaul links with the core network 22 of the cellular network. The macro basestations and SAPs also communicate with user equipment devices (UEs) via wireless links. Signals are transmitted via the wireless links from the SAP or macro basestation to the UEs (downlink) or from the UEs to the SAP or macro basestation (uplink).

The SAPs may be deployed co channel with one or more of the macro layer basestations, or may for example be deployed on a carrier channel which is partially overlapping or straddled between macro layer carrier channels.

The following description illustrates the present invention with reference to the example cellular mobile communications network part illustrated in FIG. 1 and to macro layer and small cell layer basestations comprised within the network. However, it will be appreciated that the present invention may be applied to other first and second layers of basestations within a mobile communications network, and to other technologies including heterogeneous networks and other multilayer network technologies including for example LTE.

Figure 2:
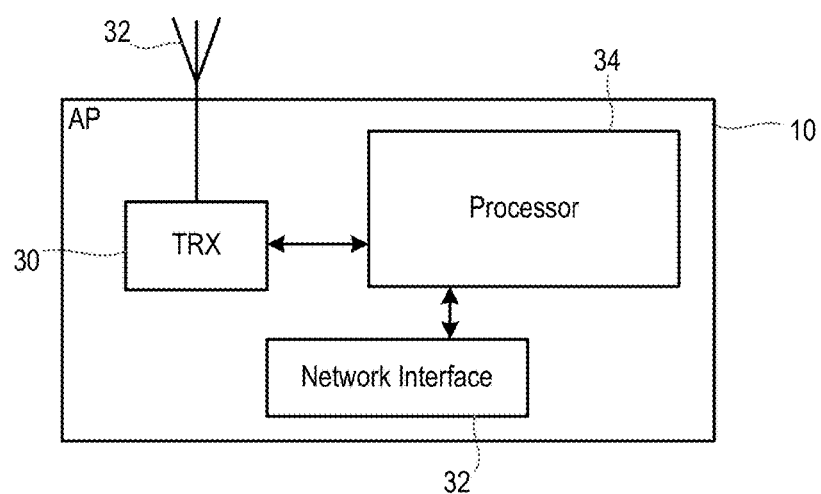
FIG. 2 is a schematic representation of a basestation operating in accordance with an aspect of the present invention.

FIG. 2 illustrates a structure of a SAP, with reference to a first SAP 10. The SAP 10 comprises radio transceiver (TRX) circuitry 30, and an antenna 32, for communication with UEs. The SAP 10 also comprises a network interface 32, for communicating with the core network 22 of the cellular network, for example over an existing broadband IP network connection.

Operation of the SAP 10 is controlled by a processor 34. For example, the SAP 10 is able to take measurements on signals received from other nearby basestations, and is able to receive measurement reports from connected UEs, and the processor 34 is configured to determine which measurements are required, and to interpret the measurement results. In addition, the SAP 10 is able to control the power of its downlink transmissions, and is able to send commands to connected UEs, in order to control the power of the uplink transmissions from those UEs, and the processor 34 is also configured to control these power settings. The present invention will be described further with reference to a SAP 10 operating in accordance with the UMTS cellular standard, but it will be apparent that the invention can be applied to any other appropriate standard.

As discussed above, deployment of SAPs on a small cell layer can cause interference to macro layer basestations within the same network. This problem is particularly prevalent in a co channel deployment, in which SAPs and macro layer basestations and associated UEs transmit on the same carrier channel. It is known to control uplink interference on macro layer basestations by setting an uplink noise rise margin for the SAPs and enforcing uplink transmit power for the SAPs to remain below the macro noise floor by at least the uplink noise margin. The uplink noise margin is established based on the expected macro noise rise contribution of UEs connected to the small cell layer. This expected noise rise contribution is based upon the average number of users connected to a SAP and transmitting at the edge of that cell, and on the average number of SAPs per macro cell site.

Figure 3:
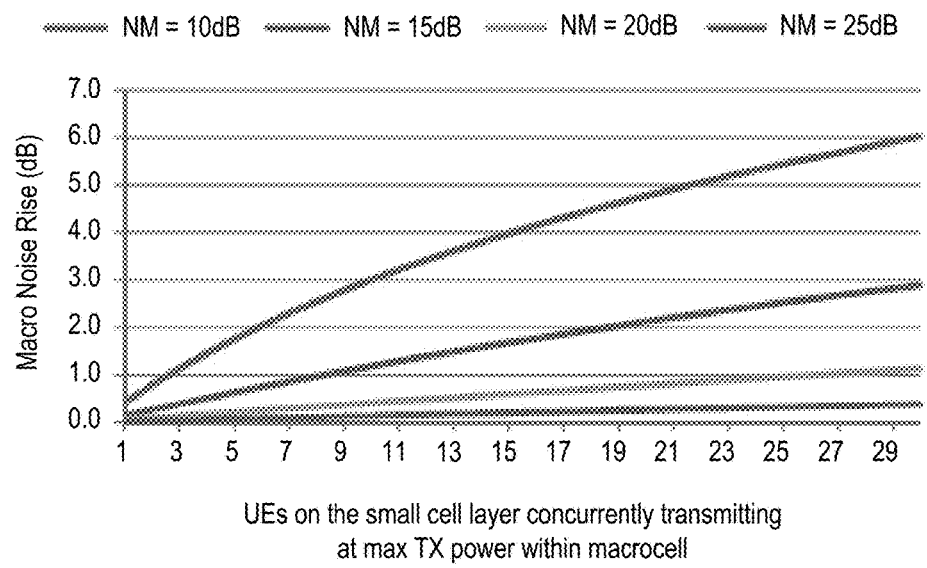
FIG. 3 is a graph illustrating macro noise rise caused which may be caused by user equipment devises (UEs) transmitting on a small cell layer.
Figure 4:
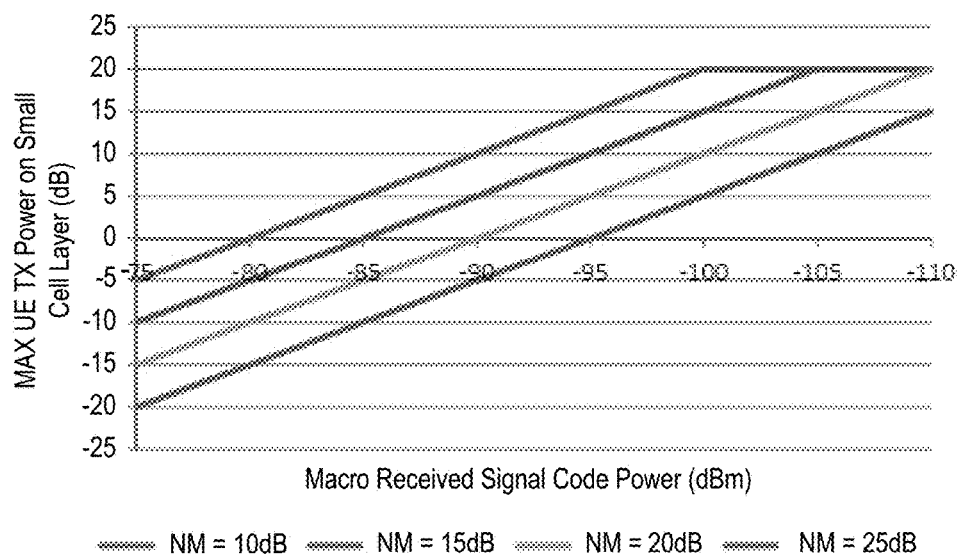
FIG. 4 is a graph illustrating how UE transmit power on a small cell layer may be affected by varying macro dominance.

Establishing an appropriate uplink noise margin involves balancing conflicting requirements of the macro and small cell layers, as illustrated in FIGS. 3 and 4. FIG. 3 illustrates the macro noise rise caused by varying numbers of UEs transmitting on a small cell layer. The macro noise rise is illustrated for a range of uplink noise rise margins (NMs) between 10 and 25 dB in a system using WCDMA technology. It can be seen from FIG. 3 that a large noise margin is required to curb macro layer interference as the density of UEs served by the small cell layer increases. Protection of the macro layer is thus served by imposing a large noise rise margin on the uplink transmit power limit for small cells. FIG. 4 illustrates the impact of varying noise rise margins on the maximum uplink transmit power for connected UEs on the small cell layer with varying levels of macro dominance. It can be seen from FIG. 4 that a large noise rise margin can impact small cell coverage and uplink throughput, particularly in areas of strong macro dominance. For example, with a 15 dB margin, in areas of strong macro dominance characterised by a macro CPICH RSCP>−80 dB, UEs are required to transmit below −5 dBm. Thus in order to reduce negative impact on the uplink performance of the small cell layer, a small uplink noise rise margin is preferable.

Aspects of the present invention address the conflicting requirements of the small cell and macro layers by adjusting power limits based on actual noise rise caused by UEs connected to the small cell layer at any given time, and by introducing the notion of a dynamic noise rise margin. Instead of establishing a fixed noise rise margin based on average behaviours, and imposing this margin on all SAPs within a network, aspects of the present invention take advantage of differing loading levels across the small cell layer to allow individual SAPs to vary the noise rise margin (i.e. the uplink transmit power limit) for their connected UEs according to individual SAP requirements and loading conditions within the relevant area. Aspects of the present invention thus allow for a more efficient distribution of available uplink power budget for the small cell layer by enabling SAPs to form self organising groups and allowing individual SAPs to take advantage of different loading patterns across the small cell layer by increasing their uplink transmit power limit when necessary without exceeding a maximum tolerable noise rise contribution at macro layer basestations.

Figure 5:
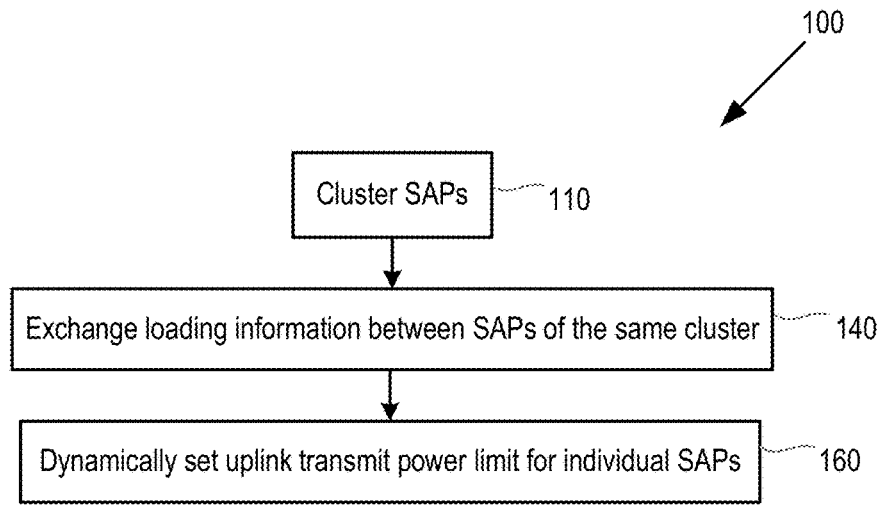
FIG. 5 is a flow chart illustrating a process in accordance with an aspect of the present invention.

A process for controlling uplink transmit power for a plurality of basestations in accordance with an aspect of the present invention is illustrated in FIG. 5. The process is illustrated and described with reference to uplink transmit power in small cell basestations coexisting with macro layer basestations in a mobile communications network, but it will be appreciated that the process may also be applied to other types of basestation and/or basestation deployment and to technologies employing heterogeneous or other multilayered network solutions.

With reference to FIG. 5, the process 100 starts in step 110 in which SAPs in the mobile network are clustered according to association with macro layer basestations. Loading information is then exchanged between SAPs of the same cluster in step 140, allowing the dynamic setting of uplink transmit power limits for individual SAPs at step 160. During this dynamic setting process, SAPs adjust their individual uplink transmit power limits according to their individual requirements at any particular time. The loading information exchanged between cluster members at step 140 allows SAPs to take advantage of reduced loading at other SAPs within the cluster to increase uplink transmit power limits when necessary without exceeding a maximum tolerable noise rise contribution at the macro layer basestations. Each of the steps in the method 100 illustrated in FIG. 5 is discussed in further detail below, with reference to FIGS. 6 to 8 and actions taken at a representative SAP 10.

Figure 6A:
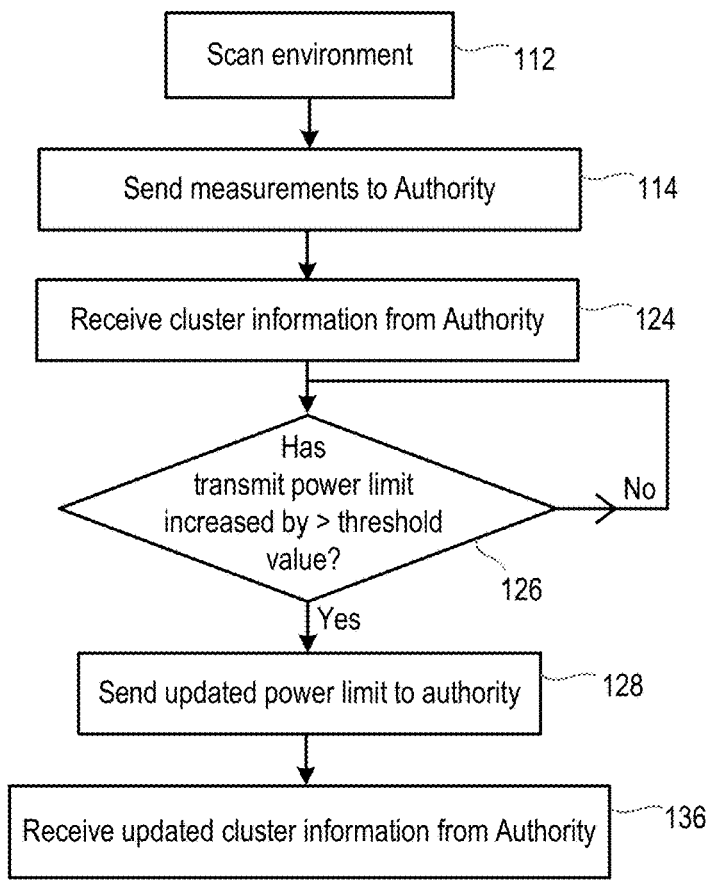
FIGS. 6a and 6b are flow charts illustrating in more detail a part of the process of FIG. 5.
Figure 6B:
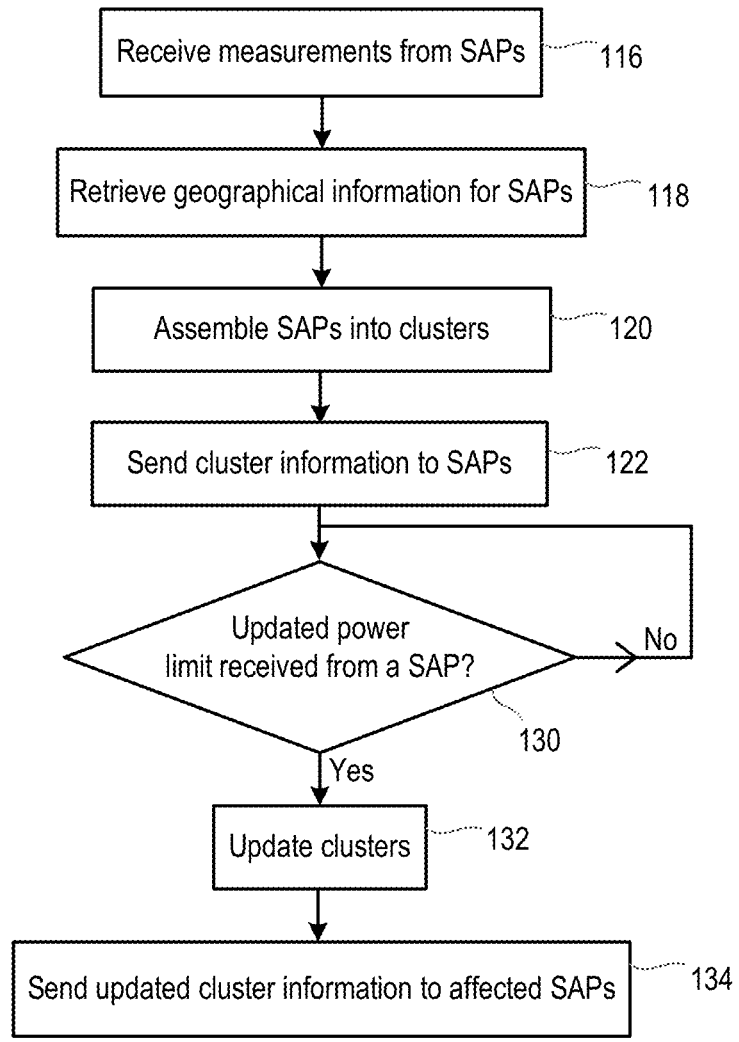

FIGS. 6a and 6b illustrate how the step 110 of clustering SAPs may be carried out. Clustering SAPs according to association with macro layer basestations may be accomplished through the combined actions of individual SAPs and a controlling entity, or Authority. The Authority may be centralised and may for example be located within the core network 22 of the mobile communications network. In other examples, the Authority may be distributed throughout the network. FIG. 6a illustrates steps taking place at individual SAPs, and is representative of steps taken at each of the SAPs in the network. For the purposes of explanation, reference is made to SAP 10, but it will be appreciated that the same steps are carried out at each of the SAPs in the network. FIG. 6b illustrates steps taken at the Authority. FIGS. 6a and 6b illustrate process steps using terminology appropriate for a WCDMA network but it will be appreciated that this is merely for the purpose of describing one example of how the process steps may be implemented.

Referring initially to FIG. 6a, in a first step 112, the SAP 10 performs a radio environment scan or monitoring (REM) and gathers a list of basestation IDs and/or PSCs (Primary Synchronisation Codes) and associated measurements for neighbouring macro basestations and SAPs. Included within the measurements is the path loss to each of the macro layer basestations identified in the REM.

The measurements obtained in the REM are sent to the Authority in step 114, and received at the Authority in step 116 as illustrated in FIG. 6b. The Authority receives, collates and records measurements from SAPs within the network at step 116, and may also assemble geographical information for the SAPs at step 118. The geographical information may for example include GPS coordinates for the SAPs, transport line identifier of SAPs etc. This geographical information may be used to assist the clustering process which then takes place at the Authority. At step 120, the Authority assembles the SAPs into clusters according to their association with macro layer basestations. Clusters are formed such that SAPs reporting the same or similar REM measurements of a particular macro basestation are placed in the same cluster. More specifically, SAPs are assembled into clusters according to the shortest reported path loss to a macro basestation. This process is illustrated in the following example in which the three illustrated SAPs report the following measurements:

SAP 10 (in order of increasing path loss):
Macro basestation A, at path loss PL_10a
Macro basestation B, at path loss PL_10b
Macro basestation C, at path loss PL_10c
SAP 12 (in order of increasing path loss):
Macro basestation A, at path loss PL_12a
Macro basestation D, at path loss PL_12d
SAP 14 (in order of increasing path loss):
Macro basestation B, at path loss PL_14b
Macro basestation E, at path loss PL_14e SAPs 10 and 12 each report the smallest path loss to the same macro basestation, basestation A, and will therefore be placed in the same cluster. The cluster to which SAPs 10 and 12 belong is associated with macro basestation A, and includes all SAPs reporting this basestation as the dominant macro basestation in their environment (as indicated by the shortest reported path loss). Each cluster of SAPs will be associated with a corresponding dominant macro basestation.

After assembling the SAPs into clusters at step 120, the Authority sends clustering information to the SAPs in step 122. Each SAP is thus informed of the cluster to which it belongs, the dominant macro basestation for that cluster and the identities of the other SAPs belonging to the same cluster. This clustering information is received at the SAP 10 in step 124.

Clustering information may be updated in the event that the uplink transmit power limit for a SAP is increased by an amount greater than a threshold value as part of the dynamic setting process of step 160. The updating process for clustering is illustrated at steps 126 to 136 of FIGS. 6a and 6b.

As discussed above, step 160 of the process for controlling uplink transmit power for a plurality of basestations involves dynamically setting an uplink transmit power limit for individual SAPs. As part of this dynamic setting process, the uplink transmit power limit of an individual SAP may be increased. A threshold value is set for each SAP, such that a power limit increase by an amount equalling or exceeding the threshold limit triggers an update of the clustering process. For each SAP, the threshold value is set at the difference between the smallest reported path loss to a macro basestation, and the next smallest reported path loss. Thus for the example discussed above, the threshold for SAP 10 would be the difference between path loss PL_10a and path loss PL_10b.

At step 126 as illustrated in FIG. 6a, the SAP 10 checks whether its uplink transmit power limit has increased by an amount greater than the threshold value. If the power limit has not increased by greater than the threshold value (No at step 126), no updating is required and the SAP 10 continues to check for future increases. If the power limit has been increased by greater than the threshold value, this information is sent to the Authority in step 128.

The Authority checks at step 130 for receipt of a report from a SAP that its uplink power limit has been increased by more than the relevant threshold value. On receipt of such a report (Yes at step 130), the Authority updates the clustering of the SAPs at step 132. The updating involves maintaining the relevant SAP in its original cluster, but also adding the SAP to a new cluster. The relevant SAP is added to the cluster associated with the macro basestation the path loss to which defined the threshold that the SAP power limit has just increased by. Continuing the example discussed above, if SAP 10 increases its power limit by the threshold value, then it remains in the cluster associated with macro basestation A but is also added to the cluster associated with macro basestation B. All SAPs affected by the updating are informed, allowing the SAP to exchange relevant loading information with other members of each of the clusters of which it is a member.

In other examples, clustering information may be updated periodically, on expiry of a time threshold set by a network operator or other controlling entity.

In still further examples, the updating process for cell clustering may take place without reference to the Authority. For example, the small cell layer may employ a self organising mechanism such as a Master Relationship Table (MRT) type self organising mechanism, enabling small cells to learn information directly from each other. Such a system may enable updating of cluster members according to changing uplink power limits without reference to the Authority.

Following the clustering process described above, each SAP within the network is able to cooperate with the other SAPs in its cluster through information exchange. Referring again to FIG. 5 and after clustering in step 110, loading information is exchanged between SAPs of the same cluster in step 140. This ongoing exchange process is illustrated in more detail in FIG. 7 and described below, again with reference to actions at the representative SAP 10.

Figure 7:
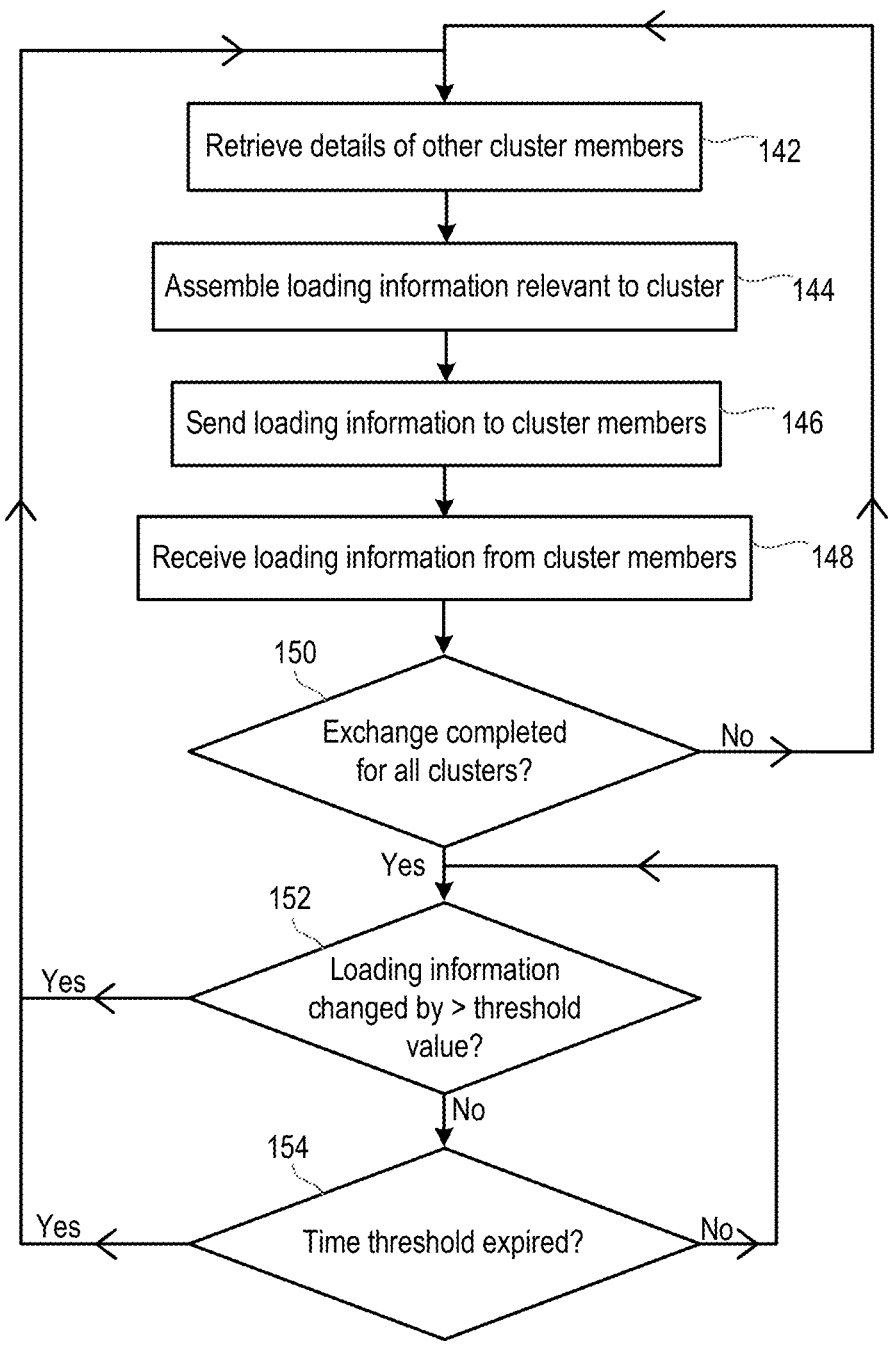
FIG. 7 is a flow chart illustrating in more detail a part of the process of FIG. 5.

With reference to FIG. 7, in a first exchange step 142, the SAP 10 retrieves details of the other members of the cluster to which it belongs. The SAP 10 then assembles, at step 144, the loading information which is relevant to the cluster. Included in the loading information is the current noise rise contribution made by UEs connected to the SAP 10 towards noise at the dominant macro basestation for the cluster. Thus according to the example discussed above, for SAP 10 the noise rise contribution of the SAP 10 cell towards macro basestation A is assembled for distribution to other members of the macro basestation A cluster. The loading information may also include number of connected UEs, UE transmit power, UE measured path loss towards macro basestations, uplink radio resource use etc.

Having assembled the relevant loading information, the SAP 10 sends the loading information to other cluster members at step 146, and receives relevant loading information from other cluster members at step 148.

This sending and receiving of information may represent one round of information exchange. After this sending and receiving of information, the SAP 10 checks whether or not it has completed loading information exchange for all clusters of which it is a member, at step 150. If the SAP 10 is a member of one cluster only, then the first round of information exchange is complete. However, as discussed above, the SAP 10 may be a member of more than one cluster, and may thus exchange loading information with two different clusters of SAPs. According to the above example, SAP 10 may have been added to macro basestation B cluster as well as macro basestation A cluster, if the uplink transmit power limit for SAP 10 has been increased by more than a threshold value. In this case, SAP 10 finds at step 150 that it has not completed exchange for all clusters of which it is a member, and thus returns to step 142 to retrieve details of members of macro basestation B cluster, to assemble cell loading information relevant to macro basestation B, and to send this loading information to other members of the macro basestation B cluster. The SAP 10 also receives loading information from other members of the macro basestation B cluster, including each SAP's contribution to the noise rise at macro basestation B.

Once one round of loading information exchange has been completed for all clusters of which the SAP 10 is a member, the SAP 10 proceeds to check at step 152 whether or not its loading information has changed by at least a threshold value. The threshold value may be set according to operator requirements to ensure that the cluster loading information stored at the SAPs is reasonably up to date. If the loading information has changed by at least the threshold value then the SAP 10 returns to step 142 to assemble and exchange the updated loading information with the members of its cluster or clusters. Loading information may also be exchanged periodically, and if the loading information has not changed by the threshold amount (No at step 152) the SAP 10 may then check at step 154 for expiry of a time threshold since the last exchange. While the time threshold has not expired, the SAP continues to check for a loading information change of greater than the threshold value. On expiry of the time threshold (Yes at step 154) the SAP returns to step 142 and assembles and exchanges loading information, regardless of whether or not this has changed by the threshold amount since the previous round of exchanges.

It will be appreciated that receipt of loading information from other cluster members may not always coincide with sending of loading information from the SAP. Periodic exchanges between cluster members may take place at the same time, but the sending of information triggered by a loading information change will not necessarily be accompanied by receipt of information from other cluster members.

The process illustrated in FIG. 7 and described above ensures that loading information is periodically exchanged between all members of all clusters, and is additionally distributed by a SAP to all members of all of its clusters whenever such information changes by an amount to be determined by a network operator or other suitable controlling entity.

The exchange of loading information described above enables the dynamic setting of uplink transmit power limits while remaining within a maximum tolerable noise rise contribution at the macro layer. This setting step, illustrated as step 160 in FIG. 5, is illustrated in more detail in FIG. 8 and described below with reference to representative SAP 10.

Figure 8:
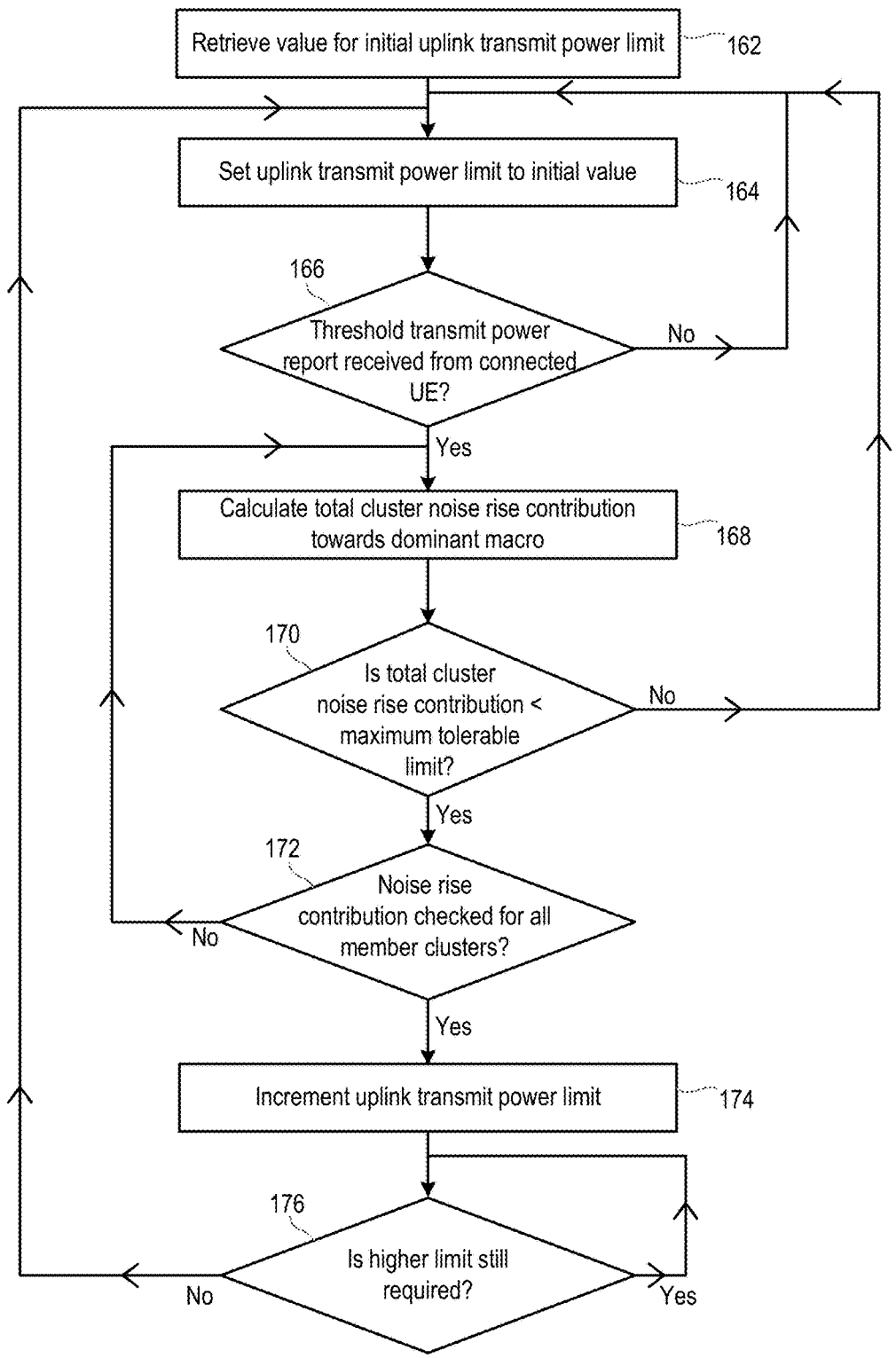
FIG. 8 is a flow chart illustrating in more detail a part of the process of FIG. 5.

Referring to FIG. 8, in a first setting step 162, the SAP 10 retrieves an initial value for the uplink transmit power limit. This initial value may be set by a network operator and stored within a memory of the SAP. In one example, the initial value is set according to the following formula:

$$\text{Initial UL TX power} = \text{Macro basestation noise floor} - \text{UL noise margin} + \text{smallest path loss to macro basestation} \qquad \text{Equation (1)}$$

The smallest path loss to macro basestation may be estimated using the following formula:

$$\text{Smallest path loss to macro basestation} = \text{CPICH transmit power(macro)} - \text{CPICH RSCP(macro)} \qquad \text{Equation (2)}$$

It will be appreciated that the parameters in the above equations are appropriate for a UMTS system, and that in applications involving different systems, including for example 4G technology, parameters such as CPICH RSCP in Equation 2 may be replaced with appropriate equivalents for other technologies.

The UL noise margin is the uplink noise margin, defining the amount below the macro noise floor that the SAP transmit power limit must remain. In generating an initial value for the uplink transmit power limit, a fixed value for the uplink noise margin may be established based average expected behaviour, as discussed earlier in the present specification.

Once the initial value for the uplink transmit power limit has been retrieved at step 162, the SAP 10 proceeds to set its uplink transmit power limit to the initial value in step 164.

During connection setup, each SAP requests connected UEs to report whenever they reach a threshold transmit power. In the present example, this threshold power is an operator defined margin delta below the initial uplink transmit power limit. The SAP 10 checks, at step 166, for receipt of a report from a connected UE indicating that the threshold transmit power has been attained. While no report is received (No at step 166) the uplink transmit power limit is maintained at its initial value. When a threshold transmit power report is received from a connected UE, the SAP 10 interprets this as a requirement for an increased uplink transmit power limit. The SAP 10 proceeds at step 168 to calculate the total noise rise contribution of the cluster of which it is a member towards the dominant macro basestation for that cluster. The total noise rise contribution is calculated based upon the loading information exchanged between cluster members, allowing a complete picture of the SAP layer contribution to noise rise at the dominant macro basestation to be established.

The SAP 10 is configured with a maximum tolerable noise rise contribution from the SAP layer towards a macro layer basestation. This in effect defines the SAP layer uplink power budget which is to be shared between the SAPs of the small cell layer. At step 170, the SAP 10 compares the calculated total noise rise contribution of the cluster to the maximum tolerable noise rise contribution with which it is configured. If the current noise rise contribution is already at or exceeding tolerable levels, no increment in power limit is made, and the uplink transmit power limit remains at the initial value. However if the total cluster noise rise contribution is below the maximum tolerable level (Yes at step 170), the SAP goes on to check the noise rise contribution for any and all other clusters of which it is a member at step 172. Once all clusters of which the SAP 10 is a member have been checked, and if the noise rise contributions are found to be below the maximum tolerable levels, then the SAP 10 proceeds at step 174 to increment the uplink transmit power limit. This increment applies only to UEs connected to the SAP 10, and does not apply to any other UEs within the network, connected to a different SAP.

After incrementing the uplink transmit power limit, the SAP 10 verifies whether or not the incremented limit is still required. This is achieved by checking for confirmation from connected UEs that all connected UEs are once again operating at transmit power levels that are below the threshold level defined by the margin delta. On receiving such confirmation, the SAP 10 reverses the increment applied to the transmit power limit and resets the transmit power limit at its initial value. The SAP 10 then continues to check for receipt of a threshold power report from any of its connected UEs.

It will be appreciated that aspects of each of the principle steps in the method for controlling uplink transmit power are of an ongoing nature. Information exchange between cluster members continues concurrently with the dynamic setting process under which uplink transmit power limits for individual cells are incremented according to requirements and the exchanged information. Similarly, the updating of clustering of the SAPs takes place on a continual basis, as prompted by incremented uplink transmit power limits and/or the deployment of new SAPs within the network.

In some examples, a network operator may track the frequency with which small cell uplink transmit power limits are changing according to the above described method. A limit may be placed on the rate of change of uplink transmit power limits. Such a limit may help to ensure stable network operation on the small cell layer and contribute to good end user experience.

Aspects of the present invention exploit temporal and spatial variation in the small cell traffic profile to adjust the uplink transmit power limit of individual SAPs. The present invention maintains protection of the macro layer by imposing a fixed limit on the acceptable macro noise rise contribution of the small cell layer, while at the same time providing flexibility to the small cell layer to exploit this uplink power budget in the most efficient way possible. This efficient exploitation involves taking advantage of lesser traffic on some SAPs to allow an increase in the uplink transmit power limit for those SAPs experiencing high loading conditions. The macro layer is thus protected without inflicting unnecessary coverage shrinkage on cells of the small cell layer. The flexibility afforded by the invention is particularly advantageous in providing better quality of service for high data rate service users on the small cell layer (e.g. High Speed Uplink Packet Access users) and in ensuring that the small cell uplink power budget is not unnecessarily imbalanced.

In some examples of the present invention, small cell clusters may employ controlled resource allocation or scheduling within the cluster in order to allow the application of less restrictive uplink transmit power limits. As discussed above, the loading information exchanged between cluster members may include uplink radio resource use, where the radio resource may be time and/or frequency. In the case of LTE systems, this information may be exchanged as resource block use. In order to further reduce the effect of the small cell cluster on noise rise at the dominant macro basestation, the small cell cluster may allocate frequency and/or time resource such that concurrent transmission on the same time or frequency resource on multiple cluster members is minimised. This resource allocation may then be taken into account when calculating the noise rise contribution of the cluster towards the macro basestation, and hence in assessing the possibility of incrementing uplink transmit power limits for individual cluster members.

Considering a cluster in which multiple members have uplink activity, the exchanged loading information between clusters may permit the allocation of radio resources in individual cluster members to minimise concurrent transmission. In an example LTE system, this may for example comprise individual cluster members allocating their resources such that half of the members having active uplink activity allow uplink transmissions on odd resource blocks, and the other half of members having uplink activity allow uplink transmissions on even resource blocks. This distributed resource allocation may then be taken into account in calculating the noise rise contribution of the cluster at the dominant macro basestation. Instead of assuming that all uplink transmissions are concurrent, the cluster members may account for the distributed resource allocation to arrive at a cluster noise rise contribution that is representative of the distributed resource allocation, and thus allows a greater margin for incrementing of individual cluster member uplink power limits.

According to further aspects of the invention there is provided a method in which SAPs in a mobile network are clustered according to association with macro layer basestations.

Loading information is then exchanged between SAPs of the same cluster, allowing the dynamic allocation of radio resources for individual SAPs. The dynamic allocation of radio resources may serve to minimise concurrent uplink transmissions on the same uplink resource, thus minimising the overall impact of the cluster on the dominant macro basestation for the cluster. The uplink resource may be time and/or frequency and the dynamic allocation of uplink radio resource may comprise time and/or frequency scheduling.

Aspects of the present invention thus provide methods for controlling uplink processes for a plurality of basestations forming a second layer within a mobile communications network that also comprises a plurality of first layer basestations. The methods involve clustering second layer basestations according to association with first layer basestations, exchanging second layer basestation loading information between second layer basestations belonging to the same cluster, and dynamically controlling at least one of an uplink transmit power limit or an uplink resource allocation for individual second layer basestations based on the exchanged loading information. Using these methods, the impact of the second layer basestations upon the first layer basestations can be maintained within acceptable limits.

As noted above, while the principles of the present invention have been described with respect to a system operating in accordance with the UMTS cellular standard, and with respect to small and macro layer basestations within such a system, the invention is applicable to a range of other technologies in which heterogeneous or other multilayered network solutions are applied. Examples of such technologies include 4G technologies such as LTE.

What is claimed is:

1. A method for controlling uplink resource allocation for a plurality of basestations in a mobile communications network, wherein the basestations form a second layer within the network, and wherein the network comprises another plurality of basestations forming a first layer, the method comprising:
   clustering the plurality of second layer basestations according to association with first layer basestations;
   exchanging second layer basestation loading information between second layer basestations belonging to the same cluster, wherein the loading information for a second layer basestation comprises radio resource use of the second layer basestation and a noise rise contribution caused by one or more user equipments attached to the second layer basestation towards noise at the first layer basestation associated with the second layer basestation;
   dynamically controlling uplink resource allocation for individual second layer basestations based on the exchanged loading information; and
   dynamically controlling uplink transmit power limits for individual second layer basestations based on the exchanged radio resource use information and the exchanged noise rise contribution information, wherein dynamically controlling an uplink transmit power limit for a second layer basestation comprises, at the second layer basestation:
   setting an initial uplink transmit power limit;
   checking for a report from an attached user equipment device that a higher limit is required;
   on receipt of a report from an attached user equipment device, calculating the total noise rise contribution at a first layer basestation from second layer basestations in the cluster based on the exchanged radio resource use information and the exchanged noise rise contribution information; and
   if the total noise rise contribution is less than a maximum tolerable noise rise contribution, incrementing the uplink transmit power limit for the second layer basestation.

2. A method as claimed in claim 1, wherein allocation of the radio resource in the second layer basestations minimizes concurrent transmission on the same time or frequency resource.

3. A method as claimed in claim 1, wherein the radio resource comprises a time resource or a frequency resource.

4. A method as claimed in claim 1, wherein the loading information is exchanged as resource block use.

5. A method as claimed in claim 4, wherein dynamically controlling uplink resource allocation for individual second layer basestations comprises:
   determining that a first one or more of the second layer basestations be configured to allow uplink transmissions on a first one or more resource blocks; and
   determining that a second one or more of the second layer basestations be configured to allow uplink transmissions on a second one or more resource blocks.

6. A method as claimed in claim 1, wherein dynamically controlling uplink resource allocation comprises frequency scheduling such that concurrent use of the same frequency resource by more than one second layer basestation is reduced.

7. A method as claimed in claim 1, wherein dynamically controlling uplink resource allocation comprises time scheduling such that concurrent use of the same time resource by more than one second layer basestation is reduced.

8. A method as claimed in claim 1, further comprising calculating the total noise rise contribution at first layer basestations from second layer basestations in each cluster of which the second layer basestation is a member.

9. A method as claimed in claim 1, wherein a report that a higher limit is required comprises a report that a user equipment device attached to the second layer basestation is operating at a transmit power that has attained a threshold level.

10. A method as claimed in claim 1, wherein clustering the plurality of second layer basestations comprises clustering according to path loss to first layer basestations, such that each cluster of second layer basestations is associated with a dominant first layer basestation.

11. A method as claimed in claim 1, wherein clustering comprises, at each second layer basestation:
   scanning the second layer basestation environment for neighbouring first layer basestations and second layer basestations; and
   sending measurement information gathered in the scan to an authority;
   and at the authority:
   assembling second layer basestations into clusters based on the received measurement information; and
   informing the second layer basestations of the assembled clusters.

12. A method as claimed in claim 11, wherein assembly of second layer basestations into clusters comprises placing all second layer basestations reporting a smallest path loss to the same first layer basestation in the same cluster.

13. A method as claimed in claim 1, further comprising updating the clustering of at least one of the second layer basestations on occurrence of a trigger.

14. A method as claimed in claim 13, wherein the trigger comprises a change in the second layer basestation uplink transmit power limit, wherein the change is of a magnitude exceeding a threshold value.

15. A basestation, comprising a processor, for use in a mobile communications network, wherein the basestation is one of a plurality of second layer of basestations within the network, and wherein the network comprises another plurality of basestations forming a first layer, wherein the basestation is adapted to control its uplink resource allocation in accordance with a method comprising:
   clustering the basestation with one or more second layer basestations according to association with a first layer basestation;
   exchanging second layer basestation loading information with the one or more second layer basestations belonging to the same cluster, wherein the loading information for a second layer basestation comprises radio resource use of the second layer basestation and a noise rise contribution caused by one or more user equipments attached to the second layer basestation towards noise at the first layer basestation associated with the second layer basestation; and dynamically controlling uplink resource allocation for the basestation based on the exchanged loading information; and dynamically controlling uplink transmit power limits for the basestation based on the exchanged radio resource use information and the exchanged noise rise contribution information, wherein dynamically controlling an uplink transmit power limit for the basestation comprises:

setting an initial uplink transmit power limit;

checking for a report from an attached user equipment device that a higher limit is required;

on receipt of a report from an attached user equipment device, calculating the total noise rise contribution at the first layer basestation from the second layer basestations in the cluster based on the exchanged radio resource use information and the exchanged noise rise contribution information; and if the total noise rise contribution is less than a maximum tolerable noise rise contribution, incrementing the uplink transmit power limit for the basestation.

16. A basestation as claimed in claim 15, wherein allocation of the radio resource in the one or more second layer basestations minimizes concurrent transmission on the same time or frequency resource.

17. A basestation as claimed in claim 15, wherein the radio resource comprises a time resource or a frequency resource.

* * * * *